(12) United States Patent
Adachi et al.

(10) Patent No.: US 11,808,671 B2
(45) Date of Patent: Nov. 7, 2023

(54) AUTOMATIC ANALYSIS DEVICE

(71) Applicant: HITACHI HIGH-TECH CORPORATION, Tokyo (JP)

(72) Inventors: Sakuichiro Adachi, Tokyo (JP); Kyoko Yamamoto, Tokyo (JP); Chie Yabutani, Tokyo (JP); Rei Konishi, Tokyo (JP); Akihisa Makino, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 562 days.

(21) Appl. No.: 16/982,146

(22) PCT Filed: Mar. 11, 2019

(86) PCT No.: PCT/JP2019/009784
§ 371 (c)(1),
(2) Date: Sep. 18, 2020

(87) PCT Pub. No.: WO2019/181620
PCT Pub. Date: Sep. 26, 2019

(65) Prior Publication Data
US 2021/0025911 A1    Jan. 28, 2021

(30) Foreign Application Priority Data
Mar. 19, 2018  (JP) ................... 2018-051283

(51) Int. Cl.
G01N 35/10     (2006.01)
B01F 31/65     (2022.01)
G01N 1/38      (2006.01)

(52) U.S. Cl.
CPC ..... G01N 35/1016 (2013.01); G01N 35/1002 (2013.01); B01F 31/651 (2022.01); G01N 1/38 (2013.01)

(58) Field of Classification Search
CPC .. G01N 35/1002; G01N 35/1016; G01N 1/38; B01F 31/651
See application file for complete search history.

(56) References Cited

U.S. PATENT DOCUMENTS

| 5,555,767 A | 9/1996 | Makino et al. |
| 2011/0136251 A1 | 6/2011 | Astle |

(Continued)

FOREIGN PATENT DOCUMENTS

| CN | 106471374 A | 3/2017 |
| JP | 63-066466 A | 3/1988 |

(Continued)

OTHER PUBLICATIONS

International Search Report, PCT/JP2019/009784, Jun. 4, 2019, 2 pgs.

(Continued)

*Primary Examiner* — Jill A Warden
*Assistant Examiner* — John McGuirk
(74) *Attorney, Agent, or Firm* — Volpe Koenig

(57) ABSTRACT

It is necessary to efficiently agitate a small amount of sample (such as blood) and reagent (such as diluted solution) in a short time with a dispensing probe having a constant tube inner diameter. An automatic analysis device, by a dispensing probe, executes an aspiration step of aspirating a reagent from a reagent vessel; a first dispensing and aspiration step of dispensing a first liquid amount of the aspirated reagent to a reaction vessel and aspirating, from the reaction vessel, a second liquid amount of a mixed liquid obtained by mixing the reagent and the sample in the reaction vessel; and a final dispensing step of dispensing the aspirated mixed liquid and the reagent in a predetermined dispensing amount. A first liquid amount Va is less than a predetermined dispensing amount Vdil.

7 Claims, 5 Drawing Sheets

(56) References Cited

U.S. PATENT DOCUMENTS

| | | | |
|---|---|---|---|
| 2013/0017621 A1* | 1/2013 | Kaminski | G01N 35/10 |
| | | | 436/180 |
| 2015/0104351 A1 | 4/2015 | Makino et al. | |
| 2017/0205321 A1 | 7/2017 | Sasaki et al. | |

FOREIGN PATENT DOCUMENTS

| | | | |
|---|---|---|---|
| JP | S6366466 A * | 3/1988 | |
| JP | 07-239334 A | 9/1995 | |
| JP | 2008-241508 A | 10/2008 | |
| JP | 2015-132521 A | 7/2015 | |
| WO | 2013/187210 A1 | 12/2013 | |
| WO | WO-2016009764 A1 * | 1/2016 | B01F 11/0074 |

OTHER PUBLICATIONS

Chinese Office Action dated Dec. 20, 2022 for Chinese Patent Application No. 201980017159.5.

* cited by examiner

FIG. 3
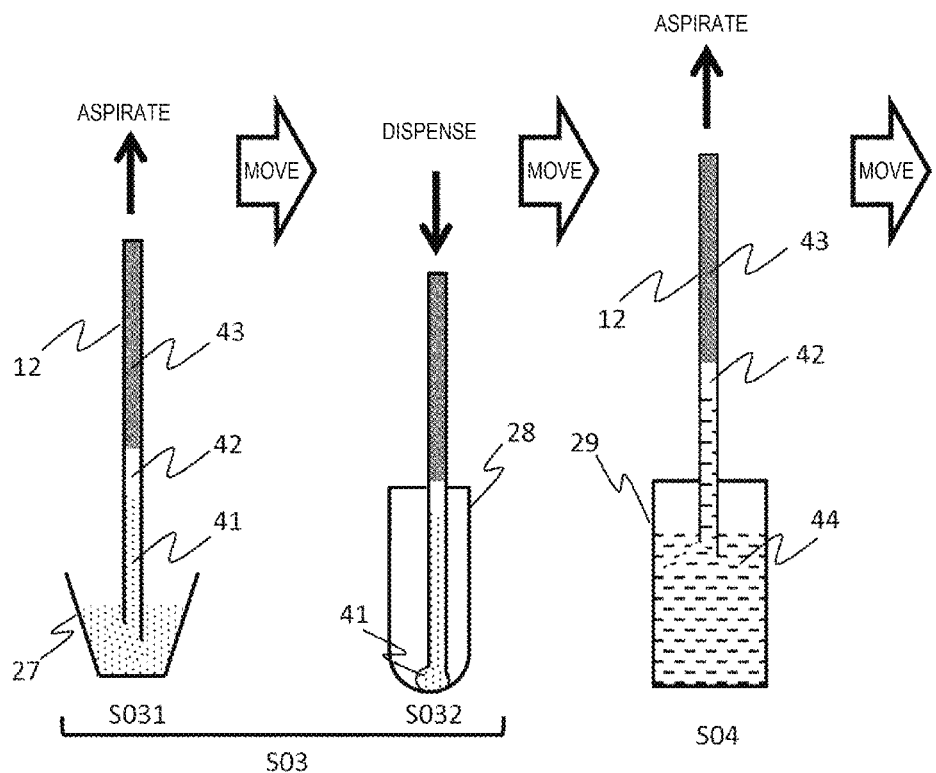
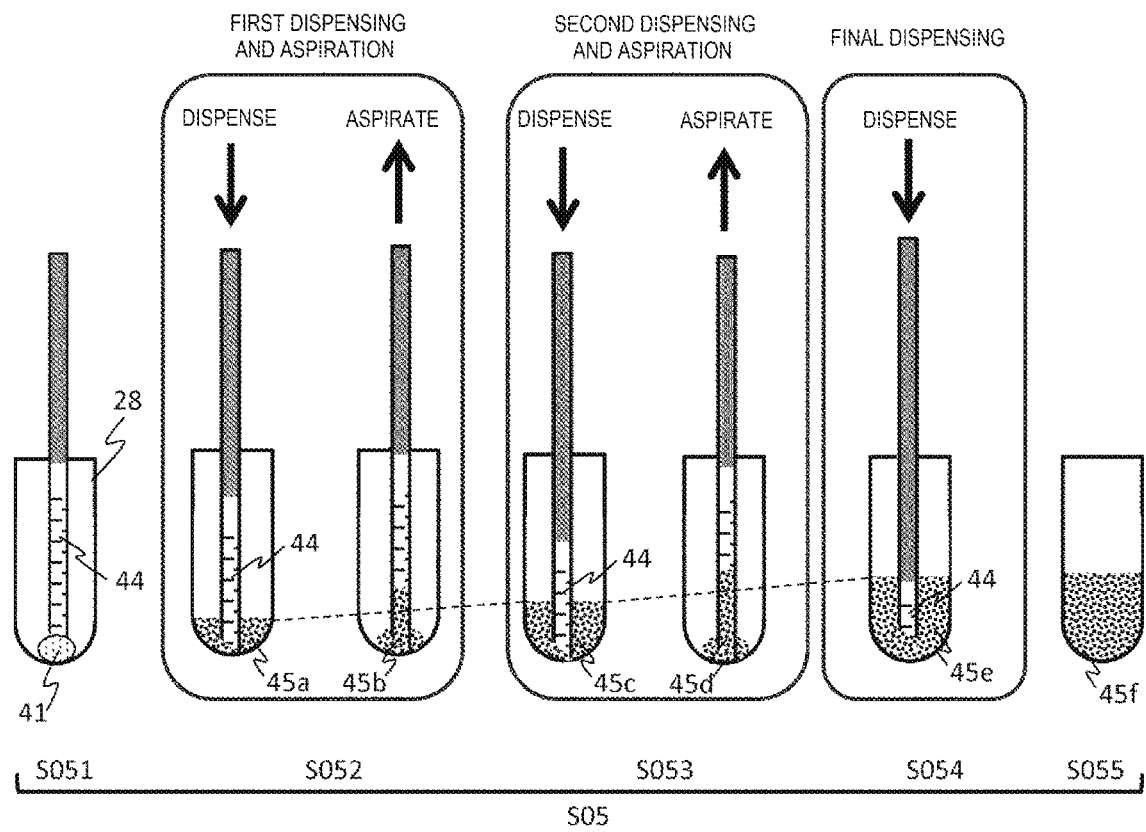

FIG. 4

| SAMPLE | P-N I | | | P-N II | |
|---|---|---|---|---|---|
| MODE | REDUCTION | STANDARD | INCREASE | STANDARD | INCREASE |
| SAMPLE DISPENSING AMOUNT S1 [µL] | 2.5 | 5.0 | 10.0 | 5.0 | 10.0 |
| DILUTED SOLUTION DISPENSING AMOUNT DL1 [µL] | 47.5 | 45.0 | 40.0 | 45.0 | 40.0 |
| NO STAGE DISPENSING | 2.9% | 2.8% | 3.2% | 5.7% | 2.8% |
| CONDITION 1 | 2.4% | 2.7% | 3.0% | 3.0% | 1.8% |
| CONDITION 2 | 2.5% | 2.4% | 2.2% | 2.4% | 1.9% |

FIG. 5

| CONDITION | SAMPLE DISPENSING AMOUNT S1 [µL] | FIRST DISPENSING AND ASPIRATION | | SECOND DISPENSING AND ASPIRATION | | FINAL DISPENSING AMOUNT Vdil [µL] |
|---|---|---|---|---|---|---|
| | | DISPENSING AMOUNT Va [µL] | ASPIRATION AMOUNT Vb [µL] | DISPENSING AMOUNT Vc [µL] | ASPIRATION AMOUNT Vd [µL] | |
| CONDITION 1 | 2.5 | 9.5 | 7.0 | 25.0 | 22.5 | 47.5 |
| | 5.0 | 9.5 | 9.5 | 25.0 | 25.0 | 45.0 |
| | 10.0 | 9.5 | 14.5 | 25.0 | 30.0 | 40.0 |
| CONDITION 2 | 2.5 | 14.9 | 12.4 | 21.0 | 18.5 | 47.5 |
| | 5.0 | 14.9 | 14.9 | 21.0 | 21.0 | 45.0 |
| | 10.0 | 14.9 | 19.9 | 21.0 | 26.0 | 40.0 |

AUTOMATIC ANALYSIS DEVICE

TECHNICAL FIELD

The present invention relates to an automatic analysis device that automatically analyzes a component contained in a biological sample such as blood.

BACKGROUND ART

As an analysis device that analyzes an amount of components contained in a sample, there is an automatic analysis device that measures an amount of transmitted light or scattered light of a single wavelength or a plurality of wavelengths obtained by irradiating a reaction liquid in which a sample and a reagent are mixed with light from a light source, so as to calculate a component amount based on a relationship between a light amount and a concentration.

The automatic analysis device includes a biochemical analysis device that performs quantitative and qualitative analyses of target components in a biological sample in the fields of a biochemical inspection and a blood inspection, a blood coagulation analysis device that measures coagulation ability of blood which is a sample, and the like.

In an automatic analysis device described in PTL 1 in which a biochemical analysis unit and a blood coagulation analysis unit are integrated, a sample dispensing probe is configured to dispense a sample to a reaction cell (for biochemical analysis) or a reaction vessel (for blood coagulation analysis) according to an analysis item measured by a blood coagulation time measurement unit. A blood coagulation analysis item includes a prothrombin time (PT) item and a fibrinogen (Fbg) item. In a former case, when measuring a calibration which is a reference for how much coagulation time changes with a change in a sample concentration, it is necessary to mix a sample with a diluted solution prepared in a reaction vessel in advance with a sample dispensing probe. Further, in a latter case, it is necessary to mix the sample and the diluted solution in the reaction vessel with the sample dispensing probe in both a calibration measurement and a normal measurement. The reaction vessel containing a diluted sample is transferred to a detection unit, and a time until coagulation is measured by dispensing a reagent for starting a blood coagulation reaction is measured.

CITATION LIST

Patent Literature

PTL 1: WO 2013/187210
PTL 2: JP-A-2015-132521

SUMMARY OF INVENTION

Technical Problem

When a sample and a diluted solution are not sufficiently mixed in a blood coagulation analysis as described above, a coagulation time reproducibility to be measured after dispensing a coagulation reagent deteriorates. An agitation mechanism may be added to sufficiently mix the sample and the diluted solution, but a device becomes complex and costly. As a method of mixing the sample and the diluted solution without such an agitation mechanism, it is conceivable to dispense the diluted solution to the sample with great force. However, it is considered that the effect is insufficient for a small amount of sample, and when a bubble is generated in a mixed liquid due to a force of dispensing, the measurement of coagulation time is hindered. As a method of preventing a bubble from being generated and mixing a sample and a diluted solution without an agitation mechanism, PTL 2 discloses that an aspiration dispensing operation (referred to as a pipetting operation) by a probe is performed after the diluted solution is dispensed.

However, PTL 2 is directed to a gene testing device. In such a device, a disposable tip is attached to a tip of a probe for dispensing so as to reliably prevent contamination of the sample. Since the disposable tip has a conical shape, it is considered that a turbulent flow occurs in a mixed liquid inside the disposable tip due to a pipetting operation, and agitation is likely to proceed. On the other hand, in a case of blood coagulation analysis, since contamination can be prevented by cleaning, a disposable chip is not used. Therefore, even when performing the pipetting operation, a cylindrical metal probe is used. Since an inner diameter of the sample dispensing probe is constant and narrow, mixing is difficult inside the probe. Further, in PTL 2, although an operation of aspirating a total amount of dispensed liquid is repeated, it is required to introduce the diluted solution in a short time of several seconds and sufficiently agitate the liquid so as to maintain throughput of the device. The agitation is progressed by repeatedly aspirating and dispensing as much of the liquid amount as possible, but there is a restriction that the agitation must be performed in time as short as possible from a viewpoint of throughput.

As described above, it is necessary to agitate a small amount of sample and reagent (diluted solution) efficiently in a short time by using a dispensing probe having a constant tube inner diameter.

Solution to Problem

An automatic analysis device according to an embodiment of the invention includes a dispensing probe configured to dispense a reagent to a reaction vessel to which a sample is dispensed; and a control device configured to control the dispensing probe. The control device controls the dispensing probe to execute an aspiration step of aspirating the reagent from a reagent vessel that stores the reagent; a first dispensing and aspiration step of dispensing a first liquid amount of the aspirated reagent to the reaction vessel and aspirating, from the reaction vessel, a second liquid amount of a mixed liquid obtained by mixing the reagent and the sample in the reaction vessel; and a final dispensing step of dispensing the aspirated mixed liquid and the reagent in a predetermined dispensing amount, in which the first liquid amount is less than the predetermined dispensing amount.

Other problems and novel features will be apparent from description of the present description and accompanying drawings.

Advantageous Effect

A small amount of sample and reagent can be efficiently mixed in a short time.

BRIEF DESCRIPTION OF DRAWINGS

FIG. 3 is a diagram showing a stage dispensing operation of a diluted solution.

FIG. 4 is a list of specimen mode conditions and test results.

FIG. 5 is a list of dispensing and aspiration amounts in a stage dispensing sequence.

DESCRIPTION OF EMBODIMENTS

Figure 1:
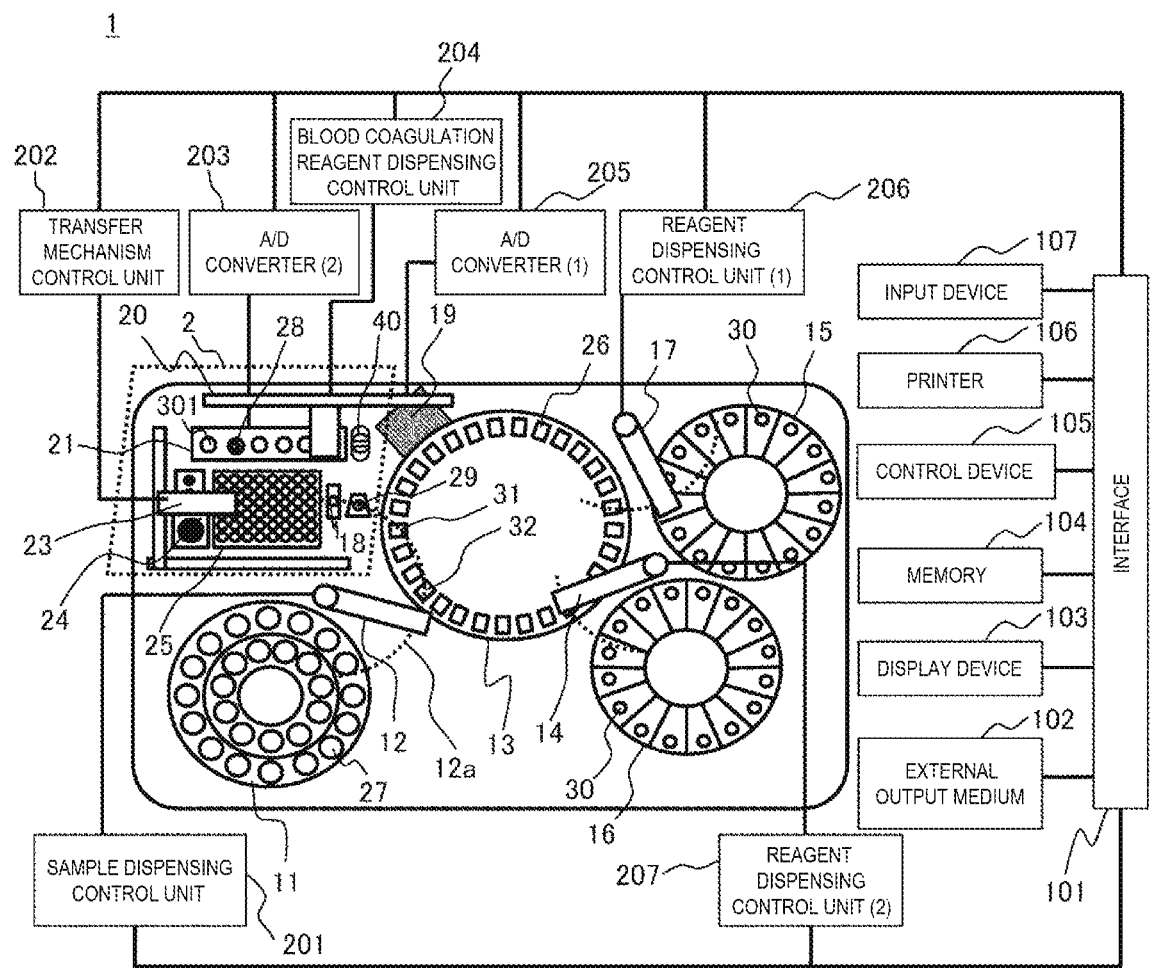
FIG. 1 is a diagram showing a configuration of an automatic analysis device.

FIG. 1 is a diagram showing a configuration of an automatic analysis device according to the present embodiment. Here, as an aspect of the automatic analysis device, a complex automatic analysis device including a turntable type biochemical analysis unit and a blood coagulation time analysis unit will be described.

A main configuration of an automatic analysis device 1 includes a reaction disk 13, a sample disk 11, a first reagent disk 15, a second reagent disk 16, a blood coagulation time analysis unit 2, and a photometer 19 which are disposed on a housing.

The reaction disk 13 is a disk-shaped unit rotatable in a clockwise direction and a counterclockwise direction, and a plurality of reaction cells (for biochemical analysis) 26 are disposed on a circumference of the reaction disk 13.

The sample disk 11 is a disk-shaped unit that is rotatable clockwise and counterclockwise, and a plurality of sample vessels 27 that store samples such as a standard sample and a test sample are disposed on the circumference of the sample disk 11.

The first reagent disk 15 and the second reagent disk 16 are disk-shaped units that are rotatable clockwise and counterclockwise, and a plurality of reagent vessels 30 that store a reagent containing a component that reacts with a component of respective inspection items contained in a sample are disposed on circumferences of the first reagent disk 15 and the second reagent disk 16. Although not shown in the figure, the first reagent disk 15 and the second reagent disk 16 are provided with a cold storage mechanism or the like, so that the reagent in the disposed reagent vessel 30 can be kept cool. A configuration in which both first reagent and second reagent used in a two-reagent system are disposed on the first reagent disk 15 or the second reagent disk 16 and a configuration in which one of the first reagent and the second reagent is disposed in each of the first reagent disk 15 and the second reagent disk 16 may be used. Whether the reagent is disposed on the first reagent disk 15 or the second reagent disk 16 may be freely set by an operator.

A sample dispensing probe 12 is disposed between the sample disk 11 and the reaction disk 13 so as to perform a dispensing operation of the sample or the reagent in the sample vessels 27 on the sample disk 11, the reaction cells 26 on the reaction disk 13, and a reaction vessel (for blood coagulation analysis) 28 and a reagent vessel (for blood coagulation analysis) 29 disposed at a first dispensing position 18 of the blood coagulation time analysis unit 2 by a rotational operation of the sample dispensing probe 12. The reagent in the disposed reagent vessel (for blood coagulation analysis) 29 can be maintained while being kept cool by providing the cold storage mechanism or the like at an installation location of the reagent vessel (for blood coagulation analysis) 29. In this example, a diluted solution is placed as a reagent in the reagent vessel 29.

A sample dispensing probe cleaning tank (not shown) is disposed on a track 12a of the sample dispensing probe 12, and the probe can be cleaned. The track 12a (broken line) of the sample dispensing probe 12 shown in FIG. 1 is a part of a rotational track of the sample dispensing probe 12.

Similarly, a first reagent dispensing probe 17 is disposed between the first reagent disk 15 and the reaction disk 13, and a second reagent dispensing probe 14 is disposed between the second reagent disk 16 and the reaction disk 13 so as to perform a dispensing operation between the reaction cell 26 on the reaction disk 13, the reagent vessels 30 on the first reagent disk 15 and the second reagent disk 16 by a rotational operation, separately.

A main configuration of the blood coagulation time analysis unit 2 includes a blood coagulation time detection unit 21, a blood coagulation reagent dispensing probe 20, a reaction vessel supply unit 25, the first dispensing position 18, a reaction vessel transfer mechanism 23, a reaction vessel discarding port 24, and a blood coagulation reagent dispensing mechanism cleaning tank 40. The blood coagulation time detection unit 21 includes a reaction vessel holding unit (not shown) that can hold the reaction vessels (for blood coagulation analysis) 28, a light source that irradiates the held reaction vessel (for blood coagulation analysis) 28 with light, and a plurality of reaction ports 301 including a light detection unit that detects the emitted light. In order to prevent contamination between specimens (samples), a disposable reaction vessel is used as the reaction vessel (for blood coagulation analysis) 28. This is because when a blood coagulation time measurement is contained as an analysis item for the specimen, blood clot is solidified by fibrin in the reaction vessel.

Next, a control system and a signal processing system according to the automatic analysis device 1 will be briefly described. A control device 105 is connected to a sample dispensing control unit 201, a reagent dispensing control unit (1) 206, a reagent dispensing control unit (2) 207, a blood coagulation reagent dispensing control unit 204, an A/D converter (1) 205, an A/D converter (2) 203, and a transfer mechanism control unit 202 via an interface 101, and transmits a signal as a command to each control unit.

The sample dispensing control unit 201 controls a dispensing operation of a sample by the sample dispensing probe 12 based on a command received from the control device 105.

The reagent dispensing control unit (1) 206 and the reagent dispensing control unit (2) 207 control a dispensing operation of a reagent by the first reagent dispensing probe 17 and the second reagent dispensing probe 14 based on a command received from the control device 105.

The transfer mechanism control unit 202 controls a transfer operation of the reaction vessel (for blood coagulation analysis) 28 among the reaction vessel supply unit 25, the first dispensing position 18, the reaction port 301 of the blood coagulation time detection unit 21, and the reaction vessel discarding port 24 by the reaction vessel transfer mechanism 23 based on a command received from the control device 105.

Further, the blood coagulation reagent dispensing control unit 204 dispenses a reagent for blood coagulation by the blood coagulation reagent dispensing probe 20 to the reaction vessel (for blood coagulation analysis) 28 that stores the sample dispensed by the sample dispensing probe 12 and to be transferred to the reaction port 301 based on a command received from the control device 105. Alternatively, a pretreatment liquid, which is a mixed liquid of the sample and the first reagent for blood coagulation analysis mixed in the reaction cell (for biochemical analysis) 26, is dispensed to the empty reaction vessel (for blood coagulation analysis) 28 by the blood coagulation reagent dispensing probe 20.

Thereafter, the second reagent for blood coagulation analysis is dispensed to the reaction vessel (for blood coagulation analysis) 28 storing the pretreatment liquid.

In the present embodiment, although a plurality of control units control a plurality of mechanisms respectively based on a command from the control device 105, the control device 105 may be configured to directly control the plurality of mechanisms.

A photometric value of transmitted light or scattered light of reaction liquid in the reaction cell (for biochemical analysis) 26 converted into a digital signal by the A/D converter (1) 205 and a photometric value of transmitted light or scattered light of reaction liquid in the reaction vessel (for blood coagulation analysis) 28 converted into a digital signal by the A/D converter (2) 203 are taken into the control device 105.

The interface 101 is connected to a printer 106 for printing when a measurement result is output as a report, a memory 104 and an external output medium 102 which are storage devices, an input device 107 such as a keyboard for inputting an operation command or the like, and a display device 103 for performing display on a screen. For example, a liquid crystal display or a CRT display is used as the display device 10.

Analysis of a biochemical item by the automatic analysis device 1 is performed in the following procedure. First, an operator requests an inspection item for each sample by using the input device 107 such as a keyboard. In order to analyze the sample with regard to the requested inspection item, the sample dispensing probe 12 dispenses a predetermined amount of sample from the sample vessel 27 to the reaction cell (for biochemical analysis) 26 positioned at a second dispensing position 31 according to analysis parameters.

The reaction cell (for biochemical analysis) 26 to which the sample is dispensed is transferred by a rotation of the reaction disk 13 and stops at a reagent dispensing position. Pipette nozzles of the first reagent dispensing probe 17 and the second reagent dispensing probe 14 dispense a predetermined amount of reagent solution to the reaction cell (for biochemical analysis) 26 in accordance with the analysis parameters of the corresponding inspection item. Contrary to the example, as for a dispensing order between the sample and the reagent, the reagent may precede the sample.

Thereafter, the sample and the reagent are agitated by an agitation mechanism (not shown) and mixed. When the reaction cell (for biochemical analysis) 26 crosses a photometric position, the transmitted light or the scattered light of the reaction liquid is measured by the photometer 19. The measured transmitted light or scattered light is converted into numerical data proportional to the amount of light by the A/D converter (1) 205, and taken into the control device 105 via the interface 101.

By using the converted numerical value, concentration data is calculated based on a calibration curve measured in advance by an analysis method designated for each inspection item. Component concentration data as an analysis result of each inspection item is output to the printer 106 or the screen of the display device 103.

The reaction cell (for biochemical analysis) 26 in which the sample and the reagent are mixed is transferred by the rotation of the reaction disk 13, and at the timing of being positioned at a third dispensing position 32, the sample dispensing probe 12 can aspirate the mixed liquid, and dispense the mixed liquid to another reaction cell (for biochemical analysis) 26 positioned at the second dispensing position 31. The second dispensing position 31 and the third dispensing position 32 are disposed at intersections of the track 12a of the sample dispensing probe and a rotational track of the reaction cell (for biochemical analysis) 26 disposed on the circumference of the reaction disk 13, respectively.

Before the measurement operation described above is executed, the operator sets various parameters necessary for analysis and registers a reagent and a sample via an operation screen of the display device 103. Further, the operator confirms an analysis result after the measurement by using the operation screen on the display device 103.

A measurement operation of the blood coagulation time item will be described. Before the measurement operation is executed, the operator sets various parameters necessary for analysis, and registers a reagent and a sample in advance via the operation screen of the display device 103. Further, the operator can confirm a measurement result by using the operation screen on the display device 103.

Figure 2:
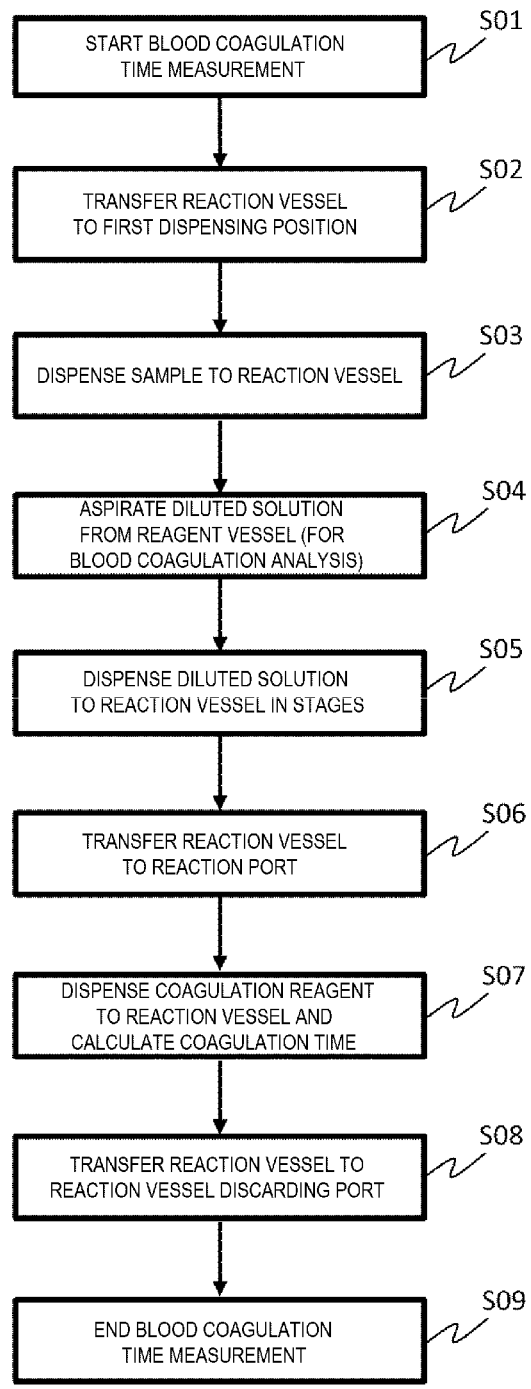
FIG. 2 is a flowchart of a measurement operation of a blood coagulation time item.

First, the operator requests an inspection item for each sample by using the information input device 107 such as a keyboard. Here, a measurement sequence of each sample is determined in accordance with a setting of the inspection item. FIG. 2 shows a flow in calibration of PT items that need to dilute the sample and in an Fbg item.

When the blood coagulation time measurement is started (S01), the reaction vessel transfer mechanism 23 transfers the reaction vessel (for blood coagulation analysis) 28 from the reaction vessel supply unit 25 to the first dispensing position 18 so as to analyze the sample for the requested inspection item (S02). The sample dispensing probe 12 dispenses a predetermined amount of sample from the sample vessel 27 to the reaction vessel (for blood coagulation analysis) 28 disposed at the first dispensing position 18 according to analysis parameters (S03).

Thereafter, the sample dispensing probe 12 is cleaned by a cleaning port (not shown) disposed on the track 12a of the sample dispensing probe 12. After the cleaning is completed, the sample dispensing probe 12 aspirates the diluted solution from the reagent vessel (for blood coagulation analysis) 29 in accordance with the analysis parameters (S04).

In order to agitate and mix the sample and the diluted solution, the sample dispensing probe 12 mixes the sample and the diluted solution by stage dispensing a predetermined amount of the diluted solution to the reaction vessel (for blood coagulation analysis) 28 disposed at the first dispensing position 18 (S05). The operation will be described later with reference to FIG. 3. The reaction vessel (for blood coagulation analysis) 28 to which the sample is dispensed is transferred from the first dispensing position 18 to the reaction port 301 of the blood coagulation time detection unit 21 by the reaction vessel transfer mechanism 23, and a temperature of the reaction vessel (for blood coagulation analysis) 28 is raised to a predetermined temperature (S06).

On the other hand, use of the reaction cells is controlled such that an empty reaction cell (for biochemical analysis) 26 to which the sample is not dispensed is generated on the reaction disk 13. The first reagent dispensing probe 17 dispenses a coagulation reaction initiating reagent to the empty reaction cell (for biochemical analysis) 26 on the reaction disk 13 in accordance with analysis parameters of the corresponding inspection item. Since the reaction disk 13 is provided with a thermostatic chamber (not shown), the coagulation reaction initiating reagent dispensed to the reaction cell (for biochemical analysis) 26 is heated to 37° C. Thereafter, the reaction cell (for biochemical analysis) 26 to which the coagulation reaction initiating reagent is dispensed is transferred by the rotation of the reaction disk 13 to a position where the blood coagulation reagent dispensing probe 20 can aspirate. When the reaction cell (for biochemical analysis) 26 to which the coagulation reaction initiating reagent is dispensed is transferred to an intersection of a rotational track of the reaction disk 13 and a track of the blood coagulation reagent dispensing probe 20, the blood coagulation reagent dispensing probe 20 aspirates the coagulation reaction initiating reagent dispensed to the reaction cell (for biochemical analysis) 26. The blood coagulation reagent dispensing probe 20 has a reagent temperature raising function, and after the coagulation reaction initiating reagent is heated to a predetermined temperature by a temperature raising mechanism (not shown), the coagulation reaction initiating reagent is dispensed to the reaction vessel (for blood coagulation analysis) 28. At this time, in the blood coagulation reagent dispensing probe 20, dispensing and agitation are performed in which the diluted sample and the coagulation reaction initiating reagent are agitated and mixed in the reaction vessel (for blood coagulation analysis) 28 by a force when the coagulation reaction initiating reagent is dispensed to the sample already stored in the reaction vessel (for blood coagulation analysis) 28.

From a time point when the coagulation reaction initiating reagent is dispensed to the sample, photometry of transmitted light or scattered light of light emitted to the reaction vessel (for blood coagulation analysis) 28 is started. The measured transmitted light or the measured scattered light is converted into data having a numerical value proportional to the amount of light by the A/D converter (2) 203, and is taken into the control device 105 via the interface 101. After the reaction is ended, the converted numerical value is used to determine a time required for a blood coagulation reaction (blood coagulation time) (S07).

Thereafter, the reaction vessel (for blood coagulation analysis) 28 in which the reaction is ended is transferred to the reaction vessel discarding port 24 by the reaction vessel transfer mechanism 23 and discarded (S08). Cleaning water or detergent is dispensed by the first reagent dispensing probe 17 or the second reagent dispensing probe 14 to the reaction cell (for biochemical analysis) 26 after the coagulation reaction initiating reagent is aspirated, and then the reaction cell (for biochemical analysis) 26 is cleaned by a reaction cell cleaning mechanism (not shown), and the coagulation time measurement is completed (S09).

Next, with reference to FIG. 3, a dispensing and aspiration agitation operation of dispensing the diluted solution to the sample while performing dispensing and aspirating in stages, which is performed by the sample dispensing probe 12 in S05, will be described. FIG. 3 shows an operation of the sample dispensing probe 12 in steps S03 to S05.

As described above, a sample 41 is aspirated by a fixed amount from the sample vessel 27 (S031). In order to precisely control an amount of the sample and the reagent to be dispensed, the dispensing probe controls an aspiration amount and a dispensing amount by a syringe pump. The sample 41 is aspirated in a state isolated from system water 43 by a segmental air 42. The segmental air 42 ensures that the sample and the reagent are not mixed with the system water 43, and the sample 41 is aspirated and dispensed as the system water 43 is aspirated and dispensed by the syringe pump. After being moved to the first dispensing position 18 where the reaction vessel 28 is transferred, the sample dispensing probe 12 dispenses the sample 41 to the reaction vessel 28 by a sample dispensing amount S1 (S032).

After the sample dispensing probe is cleaned, the sample dispensing probe 12 aspirates a diluted solution 44 from the reagent vessel 29 (S04) and is moved to the first dispensing position 18 (S051). Thereafter, the diluted solution is finally dispensed to the sample by a predetermined dispensing amount according to a dilution ratio while being dispensed and aspirated in stages, and the diluted solution is dispensed with a tip of the probe being in contact with the sample or the mixed solution so as not to generate bubbles in the sample or the mixed liquid. In first dispensing and aspiration (S052), Va of the diluted solution 44 is dispensed to the sample 41 in the reaction vessel 28, and Vb of a mixed liquid 45 of the sample and the diluted solution is aspirated. Next, in second dispensing and aspiration (S053), Vc of the mixed liquid 45 and the diluted solution 44 in the probe is dispensed to the mixed liquid 45 in the reaction vessel 28, and Vd of the mixed liquid 45 is aspirated. In a final dispensing (S054), a final dispensing amount Vdil of the mixed liquid 45 and the diluted solution 44 in the probe is dispensed to the mixed liquid 45 in the reaction vessel 28. The final dispensing amount Vdil is equal to a dispensing amount DL1 of the diluted solution 44 mixed in the sample 41. Thereafter, the sample dispensing probe 12 is pulled up from the reaction vessel 28 (S055).

In the first dispensing and aspiration and the second dispensing and aspiration, a fixed amount of mixed liquids 45b, 45d is left in the reaction vessel 28 regardless of an initial sample dispensing amount S1 during aspiration. This is because when an air bubble is mixed in the mixed liquid, the coagulation time measurement is hindered. In a comparative experiment to be described later, the mixed liquids 45b, 45d are each set to 5 μL. The amount is preferably a small amount, but may be determined to be an amount in a degree or more which enables the air bubble not to enter the mixed liquid and the sample dispensing probe 12 to operate stably. In order to perform dispensing in stages, Expression Va<Vc<Vdil . . . (1) is set. As a result, the mixed liquid 45 gradually increases and can be efficiently agitated in the reaction vessel 28.

Fbg item analysis performance is compared when conditions from Va to Vd are changed. Coagpia (registered trademark) Fbg manufactured by Sekisui Medical is used as the reagent, and control P-N I and P-N II for Coagpia are used as the sample. Ina calibration measurement, since a mixed liquid having different dilution ratios is generated, an experiment is conducted in three types: a reduction mode, a standard mode, and an increase mode in which a dilution concentration is changed. However, since the control P-N II is a low concentration specimen sample and there is little need to further dilute the control P-N II in the reduction mode, the reduction mode is omitted. FIG. 4 shows conditions of the sample dispensing amount S1 and the diluted solution dispensing amount DL1 and results thereof, separately. For each sample and mode, stage dispensing described as the present embodiment is performed under a plurality of conditions, and the results of the dispensing and aspiration agitation are confirmed. As a comparative example, the result of agitating only by performing dispensing without performing the stage dispensing is shown as "no stage dispensing".

FIG. 5 shows dispensing and aspiration amounts in each mode. The stage dispensing is performed under two conditions, in Condition 1, a first dispensing amount Va is equal to or less than half of a second dispensing amount Vc, and in Condition 2, the first dispensing amount Va is equal to or greater than half of the second dispensing amount Vc and less than the second dispensing amount Vc. In any mode of the reduction mode, the standard mode, and the increase mode, the aspiration amounts Vb, Vd are changed in the specimen mode (reduction, standard, increase) so that the mixed liquids 45*b*, 45*d* become 5 μL. The number of repeated measurements n is 36.

Figure 6:
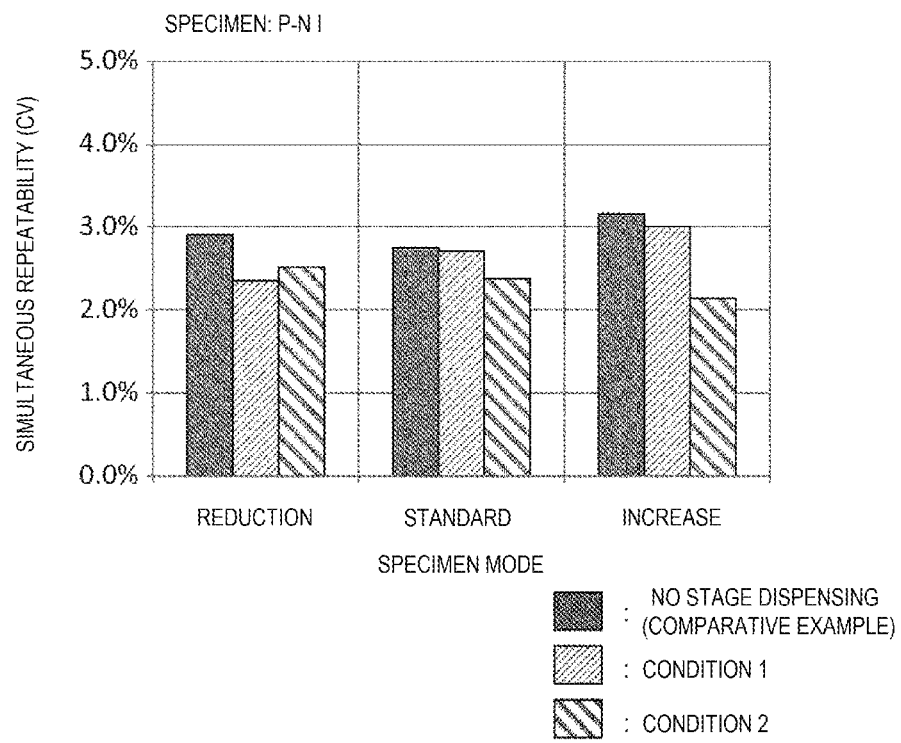
FIG. 6 is a graph of test results.
Figure 7:
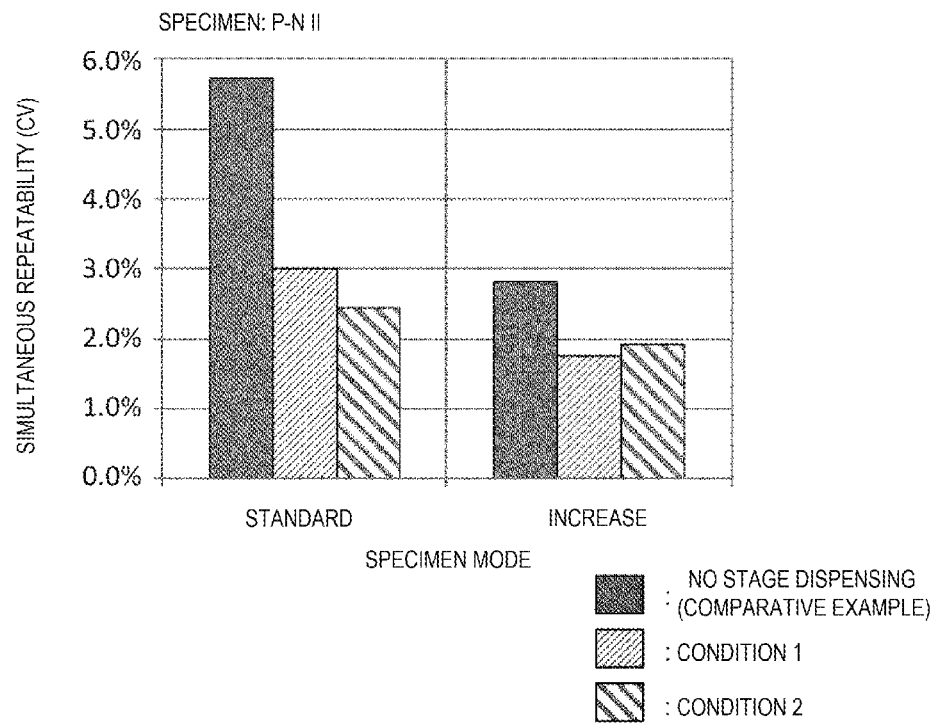
FIG. 7 is a graph of test results.

The results shown in FIG. 4 are shown in graphs of FIGS. 6 and 7. Simultaneous repeatability is a value obtained by dividing a standard deviation of a measured value by an average value. That is, it indicates that the lower the value is, the smaller the variation is, that is, the sample and the diluted solution are well agitated. In any case, the result shows that the result of performing the stage dispensing has a smaller variation than that of the comparative example. In particular, the simultaneous repeatability of the standard mode in a low concentration specimen in the comparative example is extremely large at 5.7%. On the other hand, in a case of performing the stage dispensing, the simultaneous reproducibility is suppressed to 3.0% in any case, and good results are obtained. In particular, in Condition 2, the simultaneous reproducibility is suppressed to 2.5% in any case, and particularly good results can be obtained. That is, it is considered that it is desirable to satisfy a relationship of Expression $V_c/2 < V_a < V_c$ ... (2) in addition to a condition in Expression (1). This indicates that, in the stage dispensing, the mixed liquid of the sample and the diluted solution gradually increases, so that the dispensing and aspiration agitation can be performed more satisfactorily.

In the present embodiment, when dispensing the diluted solution, the dispensing and the aspiration of a small amount of diluted solution are repeated instead of dispensing a total amount of diluted solution, the dispensing amount in stages is gradually increased, and finally the predetermined amount of diluted solution is dispensed. As a result, it is confirmed that even when a substitution amount to be dispensed and aspirated is the same, the agitation can be efficiently performed in a short time. It is considered that this is because the sample and the diluted solution are mixed in the reaction vessel rather than in the probe, unlike in PTL 2 in which the mixed liquid is aspirated and agitated in a disposable tip. Even when the total amount of diluted solution is dispensed at once, the diluted solution is only superimposed on the sample, and there is little effect on mixing, especially while preventing generation of a bubble. However, when a relatively small amount of the diluted solution is dispensed to the sample, the sample and the diluted solution are mixed with each other in the reaction vessel with a dispensing force. Further, by dispensing a larger amount of mixed liquid and diluted solution than the previously dispensed amount of mixed liquid and diluted solution after aspiration, the agitation is progressed in the reaction vessel in stages. This means that the agitation is progressed when a total amount (total substitution amount) of aspiration after dispensing is equal to or less than the final dispensing amount, which is also effective in increasing the throughput of the device.

In this comparison, it is considered that the dispensing and the aspiration are performed twice as shown in FIG. 3, but even when the dispensing and the aspiration are performed only once, the same effect can be obtained if the amount that is dispensed and aspirated is less than the final dispensing amount and the dispensing amount is increased in stages. In this case, when the dispensing amount in the dispensing and aspiration is set to Va and the final dispensing amount is set to Vdil, it is desirable that it is sufficient to satisfy Expression $V_a < V_{dil}$ ... (3), and for the same reason, it is desirable to satisfy Expression $V_{dil}/2 < V_a < V_{di}$ ... (4).

On the other hand, when it is acceptable from a viewpoint of the throughput of the device, the number of times of dispensing and aspiration is not limited to three or more. In this case, since it is preferable to increase the dispensing amount in stages, it is sufficient to satisfy Expression $V_a < V_c < V_e < V_{di1}$ ... (5) when the dispensing amount in a third dispensing and aspiration is Ve.

The invention is not limited to the above-mentioned embodiment, but includes various modifications. For example, the embodiment described above has been described in detail for easy understanding of the invention, and are not necessarily limited to those having all the configurations described. A part of the configuration of one embodiment can be replaced with another configuration, and another configuration can be added to the configuration of one embodiment. For example, mixing with a sample is not limited to a diluted solution, and is applicable to general reagents. Further, although the sample dispensing probe has been described as an example, the same effect can be obtained by the similar operation even in a case of the reagent dispensing probe.

REFERENCE SIGN LIST

1 ... automatic analysis device 2 ... blood coagulation time analysis unit 11 ... sample disk 12 ... sample dispensing probe 12*a* ... track of sample dispensing probe, 13 ... reaction disk 14 ... second reagent dispensing probe 15 ... first reagent disk 16 ... second reagent disk 17*a* ... first reagent dispensing probe 18 ... first dispensing position 19 ... photometer 20 ... blood coagulation reagent dispensing probe 21 ... blood coagulation time detection unit 23 ... reaction vessel transfer mechanism 24 ... reaction vessel discarding port 25 ... reaction vessel supply unit 26 ... reaction cell (for biochemical analysis) 27 ... sample vessel 28 ... reaction vessel (for blood coagulation analysis) 29 ... reagent vessel (for blood coagulation analysis) 30 ... reagent vessel 31 ... second dispensing position 32 ... third dispensing position 41 ... sample, 42 ... segmental air 43 ... system water 44 ... diluted solution 45 ... mixed liquid of a sample and a diluted solution 101 ... interface 102 ... external output medium 103 ... display device 104 ... memory 105 ... control device 106 ... printer 107 ... input device 201 ... sample dispensing control unit 202 ... transfer mechanism control unit 203 ... A/D converter (2) 204 ... blood coagulation reagent dispensing control unit 205 ... A/D converter (1) 206 ... reagent dispensing control unit (1) 207 ... reagent dispensing control unit (2) 301 ... reaction port.

The invention claimed is:
1. An automatic analysis device comprising:
a dispensing probe having a hollow cylindrical shape that is configured to dispense a reagent to a reaction vessel to which a sample is dispensed; and
a control device configured to control the dispensing probe, wherein the control device is configured to control the dispensing probe to execute:
an aspiration step of aspirating the reagent from a reagent vessel that stores the reagent;
a first dispensing and aspiration step of dispensing a first liquid amount of the aspirated reagent to the reaction vessel and aspirating, from the reaction vessel, a second liquid amount of a mixed liquid obtained by mixing the reagent and the sample in the reaction vessel;
after the first dispensing and aspiration step, a second dispensing and aspiration step of dispensing a third liquid amount of the aspirated mixed liquid and the reagent to the reaction vessel and aspirating a fourth liquid amount of the mixed liquid from the reaction vessel, and after the second dispensing and aspiration step, a final dispensing step of dispensing the aspirated mixed liquid and the reagent in a predetermined dispensing amount, wherein the first liquid amount is less than the third liquid amount and less than the predetermined dispensing amount, wherein the third liquid amount is less than the predetermined dispensing amount.

2. The automatic analysis device according to claim 1, wherein the first liquid amount is greater than half of the third liquid amount.

3. The automatic analysis device according to claim 1, wherein the second liquid amount is set such that the amount of the mixed liquid remaining in the reaction vessel after the first dispensing and aspiration step is equal to or greater than a predetermined amount, and the fourth liquid amount is set such that the amount of the mixed liquid remaining in the reaction vessel after the second dispensing and aspiration step is equal to or greater than the predetermined amount.

4. The automatic analysis device according to claim 1, wherein the sample is blood, the reagent is a diluted solution, and the predetermined dispensing amount is determined by a concentration at which the blood is diluted with the diluted solution.

5. The automatic analysis device according to claim 1, wherein before the aspiration step, the control device is configured to control the dispensing probe to execute a sample dispensing step of dispensing the sample from a sample vessel that stores the sample to the reaction vessel.

6. The automatic analysis device according to claim 5, further comprising:

a sample disk on which the sample vessel is disposed; and a reaction disk on which a plurality of reaction cells are disposed on a circumference, wherein a track of the dispensing probe is set such that a dispensing operation can be performed on the sample vessel on the sample disk, a reaction cell of the plurality of reaction cells on the reaction disk, the reagent vessel, and the reaction vessel.

7. The automatic analysis device according to claim 1, wherein after the first dispensing and aspiration step and before the final dispensing step, the control device is configured to control the dispensing probe to execute a dispensing and aspiration step of dispensing and aspirating the mixed liquid between the reaction vessel and the dispensing probe a plurality of times.

\* \* \* \* \*